(Model.) 3 Sheets—Sheet 1.
J. S. STEVENS & C. G. MAJOR.
COMBINED DOOR SPRING AND CHECK.
No. 333,568. Patented Jan. 5, 1886.
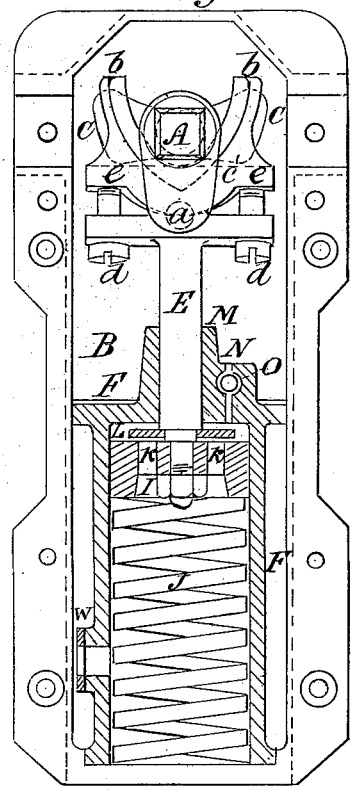
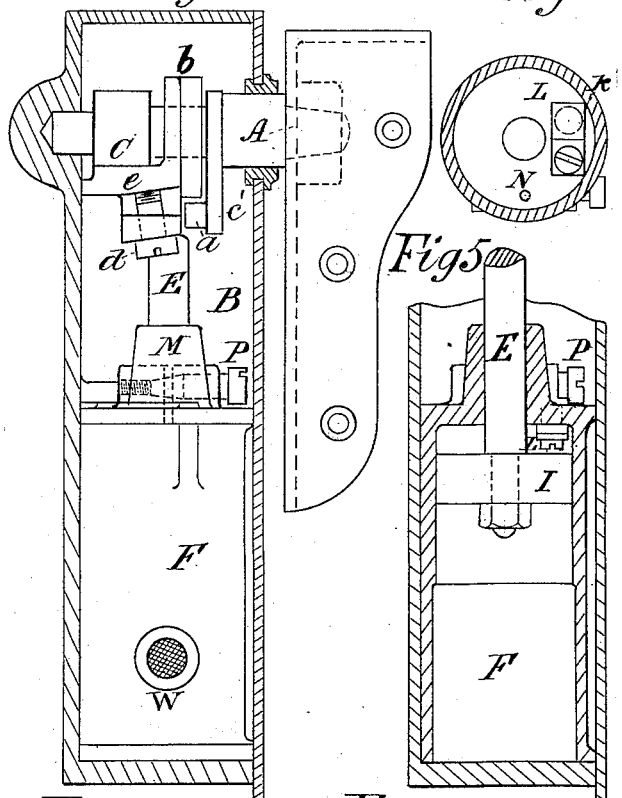
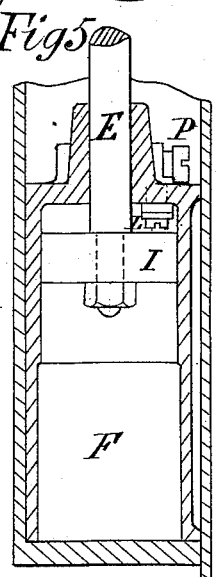
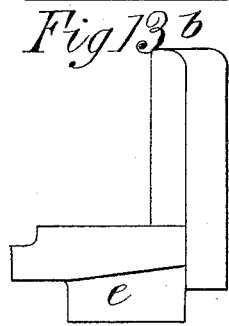
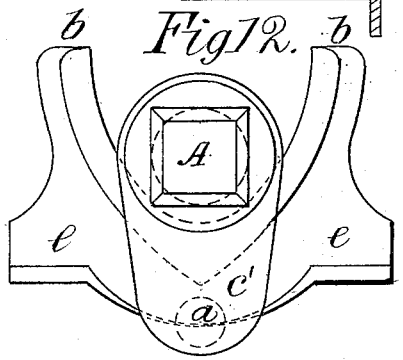
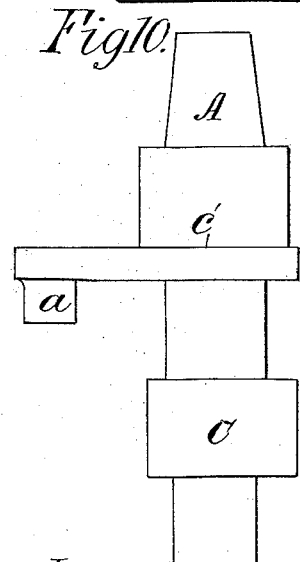
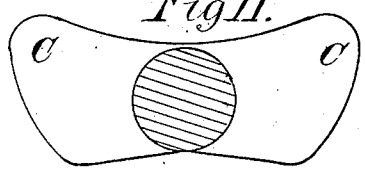
Witnesses
Willard R. Haight
J. W. Reynolds
Inventors
John Sanders Stevens,
Charles George Major,
by W. H. Babcock Attorney
N. PETERS, Photo-Lithographer, Washington, D. C.

(Model.) 3 Sheets—Sheet 2.

J. S. STEVENS & C. G. MAJOR.
COMBINED DOOR SPRING AND CHECK.

No. 333,568. Patented Jan. 5, 1886.

Witnesses
Willard R. Haight
J. W. Reynolds

Inventors:
John Sanders Stevens,
Charles George Major,
by Wm H. Babcock
Attorney

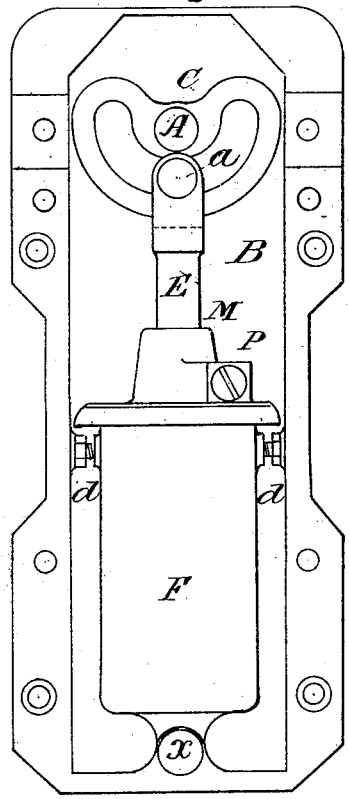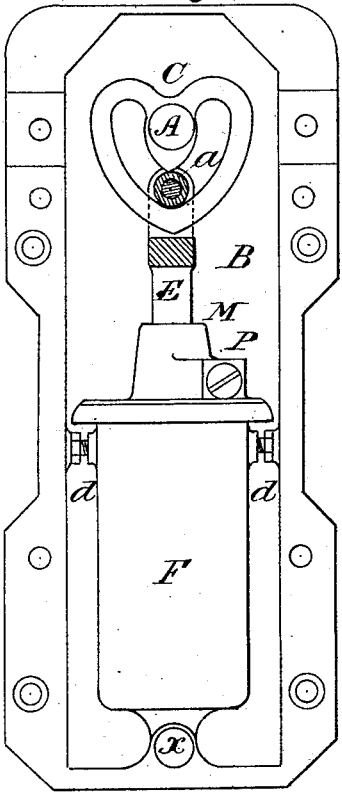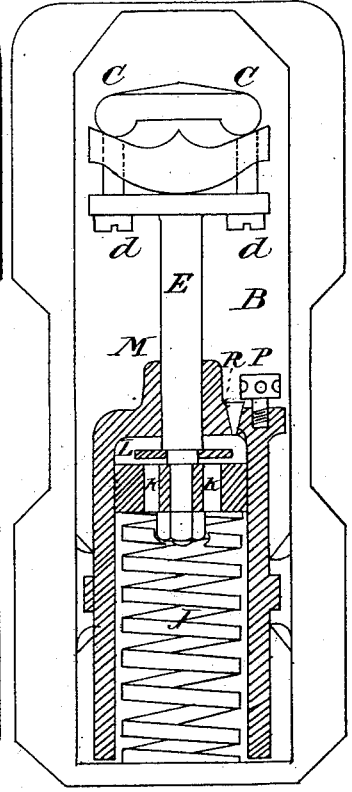

UNITED STATES PATENT OFFICE.

JOHN SANDERS STEVENS AND CHARLES GEORGE MAJOR, OF BATTERSEA, COUNTY OF SURREY, ENGLAND.

COMBINED DOOR SPRING AND CHECK.

SPECIFICATION forming part of Letters Patent No. 333,568, dated January 5, 1886.

Application filed June 29, 1885. Serial No. 170,090. (Model.)

*To all whom it may concern:*

Be it known that we, JOHN SANDERS STEVENS and CHARLES GEORGE MAJOR, subjects of the Queen of Great Britain, residing, respectively, at James Works, Queen's Road, Battersea, and 34 Feke Road, Battersea, in the county of Surrey, in that part of Great Britain called England, have invented certain new and useful Improvements in Combined Door Springs and Checks; and we do hereby declare that the following is a full, clear, and exact description of the invention, which will enable others skilled in the art to which it appertains to make and use the same.

This invention relates to that class of spring-hinges for doors and gates which are fixed in the floor, and to combine hinges and checks for doors and gates where no closing-springs are employed.

Our object is to construct a hinge, closing-spring, and check or buffer, all in one apparatus, applicable to both single and double acting doors, the apparatus being fixed beneath the floor and attached to the heel of the door in the usual manner. We are enabled by the combination hereinafter described to effect a complete control over the door when passing from the open to the closed position, so that slamming is avoided, while, on the other hand, the door cannot be blown open or rocked by the wind. The apparatus is contained in a closed box under the floor, and the moving parts efficiently protected from dust and dirt. The use of a separate contrivance for closing or checking the closing of the door, in addition to the hinges or butts, is avoided, as well as the unsightly appearance of such when attached, as is generally the case, to the door at some point above the floor-line.

The way and manner in which we attain our object will be readily understood by reference to the accompanying drawings.

Figure 3:
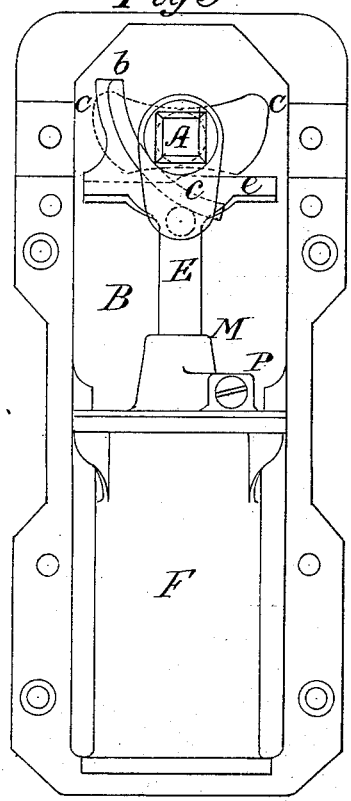
Figure 4:
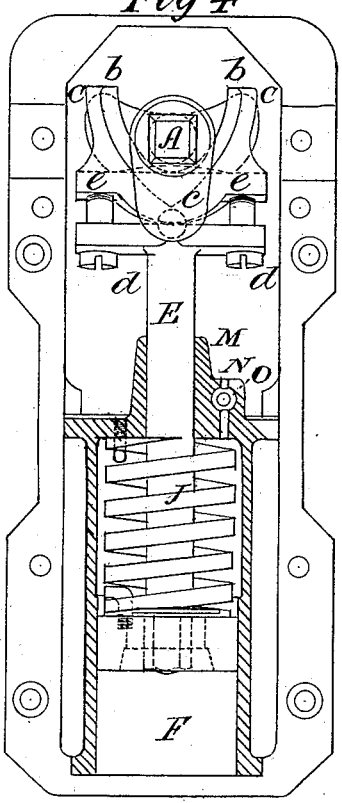
Figure 7:
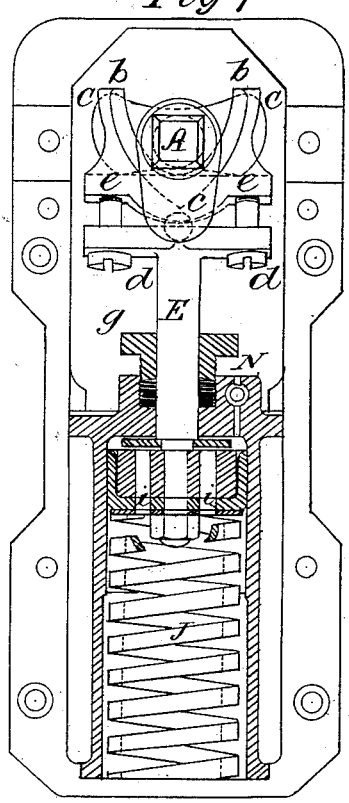
Figure 14:
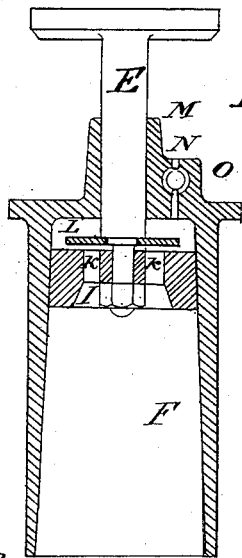

Figure 1 is a sectional elevation of our combined spring hinge and check as made for double-action doors, showing the shoe ready for screwing to the door-heel. Fig. 2 is a plan, the top cover of the box and the shoe being removed and the cylinder being shown in section in order that the closing-spring, as arranged for working in compression, may be seen. Fig. 3 is a plan of our combined hinge, spring, and check as made for single-action doors. Fig. 4 is a plan of combined hinge, spring, and check, the upper part of the cylinder being removed in order to show the closing-spring as arranged for working in tension. Figs. 5 and 6 are side and end sections showing the suction and regulating valve placed on cylinder end, instead of on piston. Fig. 7 is a plan of a double-action hinge, spring, and check, the upper part of cylinder being removed in order to show the arrangement employed for checking the closing of the door by air instead of liquid, the closing-spring being here arranged for working in compression. Figs. 8 and 9 are plans, showing interlocking double-acting hinges, springs, and checks, operated by cams, and also the arrangement for adjusting alignment of door by set-screws. Fig. 10 is an enlarged elevation of door-pivot, showing the third arm on its upper end; Fig. 11, an enlarged plan of the double arm on lower end of pivot; Fig. 12, an enlarged plan of horns, third arm, and false head; Fig. 13, an enlarged elevation of false head; Fig. 14, a sectional view showing arrangement used as a check only, with taper cylinder; Fig. 15, a sectional view showing arrangement employed when a free action of the door is required.

Similar letters refer to similar parts throughout the various views.

The spindle or pivot A, which is shown in Fig. 1 attached to the door-shoe, has near its lower end two arms, C C, (see, also, Figs. 2, 10, 11,) projecting in opposite directions, and lying at right angles to the line of the door. Within the containing-box B a cylinder, F, is fixed, open at the end farthest from the pivot, but closed at the end nearest to it, except the hole through which the piston-rod E passes. The center line of the cylinder lies beneath and parallel with the center line of door. The piston-rod E has secured to it a piston, I, (see Fig. 2,) working within the cylinder F, the piston having ports or holes K K in it for the passage of liquid which is contained in the box B. A small valve, L, which may be made of metal, leather, india-rubber, or other suitable substance, is fitted on the piston on the side toward the pivot, so arranged as to cover the ports or holes K K on the piston I when in contact with it, but allowed a limited amount of freedom, to permit the free passage of liquid when required. A spiral or other spring, J, is compressed within the cylinder, between the piston I and the end of the containing-box B. At one point in the side of the cylinder, in that part occupied by the spring, and over which the piston does not pass, a hole, W, is provided, (see Figs. 1 and 2,) giving free communication between that portion of the cylinder F and the containing-box B. This opening is protected by a piece of wire-gauze, perforated metal, or similar straining or filtering device, to exclude chips, dirt, and other impurities from the cylinder. At the end of the cylinder next the pivot, a projecting boss, M, is provided, through which a small hole, N, is made in a horizontal direction, to afford passage for liquid or air from the cylinder into the containing-box B. Through the same boss another hole, O, is made in a vertical direction, and intersecting the horizontal hole N. The vertical hole O is divided into three sections, the lower section being made with an internal thread for a screw. The middle section is conoidal and larger at the top, the horizontal hole N intersecting at the center of this section, and the upper section is plain and parallel and of a diameter equal to the upper end of the center section. A screw, P, is exactly fitted to this vertical hole O, and when screwed home intercepts the passage through the horizontal hole, but if screwed back opens a passage round the conoidal portion, and permits the outflow of the liquid or air from the cylinder F to be regulated to any desired extent. The piston-rod E has at its outer end a T-shaped head, to which is screwed a false head or rubbing-piece, e, (see Figs. 1, 2, 12, 13,) the lower portion of which is provided with a vertical flat surface lying at right angles to the center line of cylinder, which surface is forced by the spring J into contact with the two arms C C of pivot A. Both arms of the pivot being in contact with the false head, the pivot cannot be turned in either direction without forcing back the piston-rod into the cylinder. Therefore the pivot, and by means of the shoe the door, is held firmly in the central position, to the extent of the strength of the spring J. The false head e (see Figs. 2 and 12) is formed with a rounded surface where in contact with the piston-rod head, and is secured thereto by two screws, d d. By slackening either one of the screws and tightening the other the false head e may be thrown slightly out of line in either direction, thereby changing the position of the arms of the pivot, and setting over the point of the door to the required position should the containing-box or shoe have been placed in accurately. The containing-box B is filled with oil, glycerine, spirits, solution of soft soap, or other suitable liquid, or these may be omitted, air alone being used, and a cover-plate is fixed over the whole. The action is as follows: If the door is opened in either direction, one or other of the pivot-arms C C will thrust back the piston-rod E into the cylinder F, forcing back the piston I and compressing the spring J behind it. The liquid or air contained in box B has now flowed freely through the ports K K in the piston I into the end of the cylinder nearest the pivot, filling this portion of the cylinder. When the door is released, the spring J, pressing upon the piston I, drives it back again; but this motion is opposed by the liquid or air behind the piston, for immediately the piston commences to return, the valve L, covering the ports K K in piston I, closes automatically, and the entrapped liquid or air can only escape through the small horizontal hole N, provided in the closed end of the cylinder, its rate of escape being controlled by the vertical screw P. A small amount of leakage takes place round the piston I and piston-rod E; but this is unimportant, and with liquid possessing a fair amount of viscosity may be neglected. The speed at which the piston-rod is returned, and the door thereby closed, is therefore slow; but it can be controlled and varied by means of the vertical screw P to meet any requirement. While the piston is being returned by the spring, liquid or air is flowing into the spring portion of the cylinder through the crevices between the end of the cylinder and the containing-box, and through the gauze-protected hole W, filling it ready for a succeeding cycle of operations. The peculiar form given to the arms of the pivot is such that as the door moves from the closed position a continually-decreasing movement is given to the piston for an equal or regular angular movement of the door, the result being that less spring-resistance to opening is met with in the open positions, and, on the other hand, the greatest spring power of holding the door is given in the closed position.

In the mechanism hereinbefore described, though the return motion of the piston-rod and false head is positively retarded and controlled, the motion of the door is not so controlled. Its connection with the piston-rod is one of contact only, and while the piston is slowly returning to the normal or closed position, the door may be closed by hand at a quicker rate. For the same reason, if the wind is blowing in the direction in which the door is closing, it would carry the free door past the center until the opposite pivot-arm met the advancing piston-rod, and the door would then be closed from the opposite side in the face of the wind. Again, when the piston commences to return, under the influence of the spring, it has a sensible amount of free movement during the instant of time occupied in closing the valve. This takes the form of a quick impulse, which, transmitted through the pivot-arm to the door, gives the latter an impetus which carries it considerably in advance of the piston-rod. When the impetus is exhausted, the door waits for the following piston-rod, and is finally carried to the closed position. These independent movements of the door are objectionable, and we prevent them by means of an interlocking device constructed in the following manner: The upper portion of the door-pivot A, Figs. 1, 2, 12, 13, is provided with a third arm, C', projecting at right angles to the other arms, C C, and pointing toward the front of the door. From the under side of this arm a pin, a, projects downward. On the top of the false head e of piston-rod E we provide two horizontal horns, b b, Figs. 12 and 13, embracing the pivot A and placed at the same height as the pin a on the third arm, C'. The combined motions of the pin a and the false head e will give the path taken by the former with regard to the latter, and the form given to each horn b corresponds to this path, and is such that the pin a on third arm, C' shall travel round the outside of horn b. The lower arms, C C, of pivot A and the flat surface of false head e produce one cam-movement, and the pin on the third arm, C', and the horns b b of false head produce another and distinct cam-movement. So long as they both work together all is free; but if the door has any tendency to run away from the piston-rod E, the pin a of the third arm, C', comes into collision with the horn b, and the door cannot advance till the piston-rod has moved the horn forward out of the way. The horn is, in fact, a continuous obstacle to the closing of the door, which obstacle is, however, removed at the proper speed by the advancing piston-rod.

We apply the same device to a single-action door; but in that case (see Fig. 3) we omit one of the horns b and extend the other slightly past the center line of piston-rod. We also cut away one end of the flat face of false head e, so that only one of the lower arms, C, of pivot A shall bear against it, and the door is held in the closed position by being pressed tightly against the rabbet or other stop provided in the door-frame.

The drawings show the false head e and the piston-rod E constructed in one piece, as no adjustment for alignment is needed in this case.

The check apparatus without the spring J may be applied to doors closed by other independent springs or to doors devoid of springs, for the purpose of preventing slamming by wind. In this case we prefer to bore the cylinder taper, (see Fig. 14,) so that the piston I fits only when the door is nearly closed. The earlier part of the movement may then be readily made by hand.

For positions where there is little wind, or a free action of the door is preferred, we sometimes omit the horns on the false head. We then make the pivot-arms C C as shown in Fig. 15, the check action being regulated by a set-screw, P, the head of which covers a conical plug or valve, R, fitting in the horizontal hole N.

The closing-springs may be spiral, helical, conical, coiled, or other convenient form, and they can be used either in compression or tension.

Fig. 2 shows the spiral spring J worked in compression, and Fig. 4 the same in tension.

The liquid used for checking the too sudden closing of the door may also be replaced by air.

Fig. 7 shows the arrangement we employ. In this case the piston-rod E passes through a gland or stuffing box, g, and the piston is formed with a cup or collar, i, made of leather or other suitable material. In other respects the arrangement is the same as already described. If more convenient, the valve L on piston may be placed on the end or side of cylinder. Figs. 5 and 6 show the arrangement we prefer to adopt in such a case. L is the valve. K is the inlet-port, through which the liquid or air is drawn into the cylinder F. N is the outlet, the area of which is regulated by set-screw P, as already described.

We do not confine ourselves to the particular methods of carrying out our invention hereinbefore described, as the disposition of the spring, the form of the lower arms of the pivot, the arrangement of the upper cam-movement with its relationship to the lower cam-movement, and other details of construction, may be modified without departing from the matter and spirit of our invention. For instance, two obvious methods of varying the cams are shown in Figs. 8 and 9. By these arrangements we are enabled to effect a complete control over the door, while dispensing with the false head e and third arm, C', the locking-pin a being replaced by a roller, a, studded onto the end of the piston-rod E, which is forked to receive it. In both cases the door-pivot A has only one arm, C, of a cam shape, having a groove in which the locking-roller a travels. It will be seen that the door cannot run away from the checking device contained in the cylinders F, which is identical with those already described. In both these arrangements we prefer to place the screws d d, for adjusting the alignment of the door, at the side of the box B, and to pivot the cylinders to the end of box, as at x. The springs can be arranged for working in tension or compression, as may be most convenient, or they can be dispensed with if the modifications be used for checking doors closed by independent springs, or having no closing-springs at all.

We intend the word "door" throughout this specification and claims following to include doors, gates, windows, casements, trap-doors, lids, covers, &c.

What we claim, and desire to secure by Letters Patent of the United States, is—

1. The combination, with the door-pivot A, of the arms C C, the false head e, provided with horns b b, the piston-rod E, the set-screws d d, the piston I, provided with ports K K, the valve L, the spring J, the cylinder F, in which said spring works, the gauze-covered inlet-hole W and outlet-hole N in said cylinder, and the adjusting screw P, all substantially as and for purposes set forth.

2. The combination of a pivot having two arms, with the false head e, set-screws d d, the piston-rod E, spring J, and the cylinder F, substantially as set forth.

3. In a combined spring hinge and check, the arms C C of the pivot A, in combination with the cam c and false head e, having horns b b, for curbing the free movement of the door, substantially as set forth.

4. The arm C', provided with pin a, in combination with the false head e, having horns b b, the piston-rod E, to which said false head is attached, and the lower arms, C C, of pivot A, one of said horns b being moved into and out of position for engaging said pin a, and thereby preventing the closing of the door, substantially as set forth.

5. The combination, with the cylinder F, provided with the gauze strainer W and the intersecting exit-holes N and O, of the regulating-screw P, for controlling the outlet of liquid or air, substantially as set forth.

6. In a double or single acting spring hinge and check, the combination of false head e and set-screws d d with piston-rod E and cylinder F, for adjusting alignment of cylinder.

In testimony whereof we affix our signatures in presence of two witnesses.

JOHN SANDERS STEVENS.
CHARLES GEORGE MAJOR.

Witnesses to the signatures of the said John Sanders Stevens:
    R. JAMES,
    W. BIBBY,
*Clerks to Grain & Sons, Notaries, 7 Popes Head Alley, London.*

Witnesses to the signature of the said Charles George Major:
    W. BIBBY,
    C. I. PITT,
*Clerks to Grain & Sons, Notaries, 7 Popes Head Alley, London.*